US012188647B2

(12) United States Patent
Yu

(10) Patent No.: US 12,188,647 B2
(45) Date of Patent: Jan. 7, 2025

(54) LOW VOLTAGE ARTIFICIAL TREE TRUNK WITH INTEGRATED AC POWER

(71) Applicant: Ledup Manufacturing Group Limited, Irwindale, CA (US)

(72) Inventor: Jing Jing Yu, Irwindale, CA (US)

(73) Assignee: Ledup Manufacturing Group Limited, Irwindale, CA (US)

( * ) Notice: Subject to any disclaimer, the term of this patent is extended or adjusted under 35 U.S.C. 154(b) by 181 days.

(21) Appl. No.: 18/151,167

(22) Filed: Jan. 6, 2023

(65) Prior Publication Data

US 2023/0220980 A1 Jul. 13, 2023

Related U.S. Application Data

(60) Provisional application No. 63/266,603, filed on Jan. 10, 2022.

(51) Int. Cl.

*F21V 23/00* (2015.01)
*F21V 23/06* (2006.01)
*F21W 121/04* (2006.01)
*F21Y 115/10* (2016.01)

(52) U.S. Cl.

CPC ......... *F21V 23/06* (2013.01); *F21W 2121/04* (2013.01); *F21Y 2115/10* (2016.08)

(58) Field of Classification Search

CPC ........ F21V 23/06; F21V 21/12; F21V 21/002; F21V 23/00; F21V 33/00; F21Y 2115/10; A41G 1/00; A47G 33/06; F21W 2121/04

See application file for complete search history.

(56) References Cited

U.S. PATENT DOCUMENTS

| | | | | |
|---|---|---|---|---|
| 9,894,949 | B1 * | 2/2018 | Chen | F21S 4/10 |
| 2013/0163231 | A1 * | 6/2013 | Chen | A47G 33/06 29/825 |
| 2013/0308301 | A1 * | 11/2013 | Chen | F21S 4/10 362/123 |
| 2021/0007527 | A1 * | 1/2021 | Loomis | A41G 1/005 |

* cited by examiner

*Primary Examiner* — Tuan T Lam

(74) *Attorney, Agent, or Firm* — William W. Cochran; Cochran Preund & Young LLC

(57) ABSTRACT

Disclosed is a combination plug that provides both AC and DC power to an artificial pre-lit tree. Connector assemblies between trunk sections of the artificial tree connect both AC and DC power between the trunk sections. DC power sockets are provided on the trunk sections so that light strings can be plugged into the trunk sections and receive DC power.

9 Claims, 12 Drawing Sheets

LOW VOLTAGE ARTIFICIAL TREE TRUNK WITH INTEGRATED AC POWER

BACKGROUND

Artificial pre-lit trees have become popular, especially Christmas trees, during the holiday season. Use of LED and other types of lighting make the artificial trees a good alternative to cut trees. The artificial trees can be used for multiple seasons and the appearance of the trees have advanced sufficiently, in that the artificial trees look very much like actual trees. Although the initial expense is greater than a cut tree, the ability to use the pre-lit artificial tree over many seasons or year-round greatly reduces the price.

SUMMARY

The present invention may therefore comprise a method of supplying both alternating current (AC) power and direct current (DC) power to an artificial tree comprising: providing a combined AC and DC power plug that supplies AC power on an AC power supply lead and DC power on a DC power supply lead; connecting the AC power supply lead to an AC power socket of a connector assembly, the AC power socket mounted in an interior portion of a first trunk section of the artificial tree; mounting an AC power plug, of the connector assembly, in an interior portion of a second trunk section, of the artificial tree, so that the AC power plug engages the AC power socket when the first trunk section is joined together with the second trunk section; connecting a DC power supply lead to at least one lower DC power socket mounted on the first trunk section; placing a lower internal DC power lead in the interior portion of the trunk of the first trunk section; connecting a first end of the lower internal DC power lead to the at least one lower DC power socket; connecting a second end of the lower internal DC power lead to at least one additional lower DC power socket; connecting a lower DC connector cord to the at least one lower DC power socket on the first trunk section; connecting an upper DC connector cord to at least one upper DC power socket on the second trunk section; connecting the lower DC connector cord to a lower connector of a connector assembly; connecting the upper DC connector cord to an upper connector of the connector assembly; aligning the lower connector with the AC power socket; aligning the upper connector with the AC power plug; joining the lower connector and the upper connector so that upper DC contacts on the upper connector and lower DC contacts on the lower connector are engaged and the AC power plug is inserted into the AC power socket to transfer both AC power and DC power through the connector assembly.

The present invention may further comprise a system of supplying both alternating current (AC) power and direct current (DC) power to an artificial tree comprising: a combined AC and DC power plug that supplies AC power and DC power to the artificial tree; an AC power supply lead connected to the combined AC and DC power plug that supplies AC power to the artificial tree; a DC power supply lead connected to a lower DC power socket that supplies DC power to the artificial tree; a connector assembly comprising: an AC power socket connected to the AC power supply lead, the AC power socket mounted in an interior portion of a first trunk section of the artificial tree proximate to an end portion of the first trunk section; an AC power plug mounted in a second trunk section of the artificial tree at a location proximate to an end portion of the second trunk section so that the AC power plug engages the AC power socket to transfer AC power between the AC power socket and the AC power plug when the first trunk section is assembled with the second trunk section; a lower connector mounted on an exterior portion of the first trunk section and aligned with the AC power socket, the lower connector connected to the DC power supply lead and having a lower connector structure and lower DC contacts; an upper connector mounted on an exterior portion of the second trunk portion and aligned with the AC power plug, the upper connecter having a structure that matches and engages the lower connector structure, and upper DC contacts that connect with the lower DC contacts to transfer DC power between the lower connector and the upper connector when the first trunk section is assembled with the second trunk section; a plurality of lower DC power sockets disposed on the first trunk section that are electrically connected to the DC power supply lead; a lower internal DC power lead that connects the plurality of lower DC power sockets so that at least one light string can be connected to at least one of the plurality of lower DC power sockets; a plurality of upper DC power sockets disposed on the second trunk section that are electrically connected to the upper connector; an upper internal DC power lead that connects the plurality of upper DC power sockets so that the at least one light string can be connected to the plurality of upper DC power sockets.

DETAILED DESCRIPTION OF THE EMBODIMENTS

Figure 1:
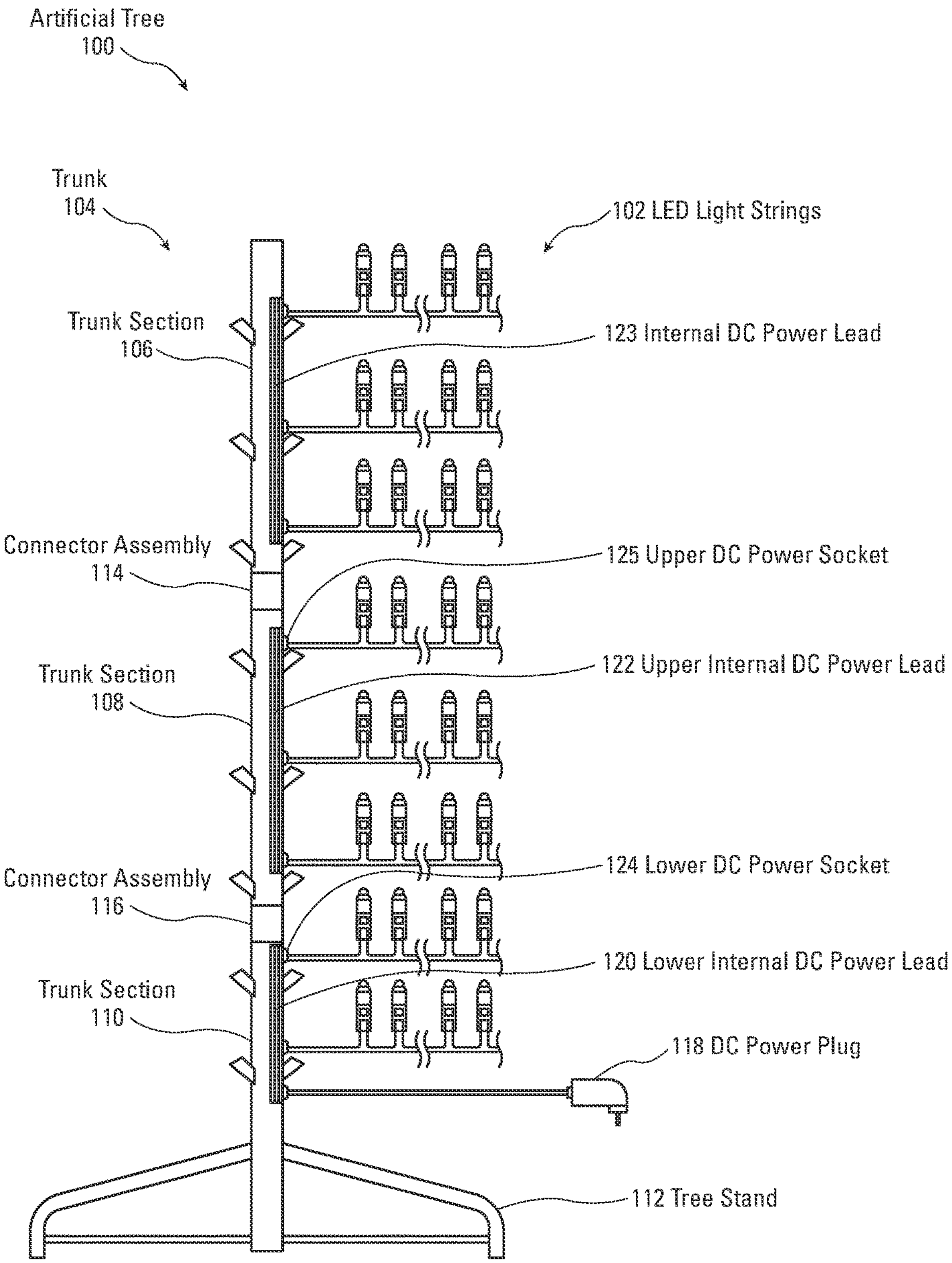
FIG. 1 is a schematic side view of an embodiment of the artificial tree of the present invention.

FIG. 1 is a schematic side view of an artificial tree 100. The branches of the artificial tree 100 are not shown in FIG. 1. A number of LED light strings 102 are shown attached to the trunk 104 via various DC power sockets, such as lower DC power socket 124 and upper DC power socket 125. The trunk 104 is made up of a series of trunk sections 106, 108, 110. The trunk sections 106, 108, 110 slide together and electrical connections are made at various connector assemblies 114, 116. Of course, as many trunk sections, as desired, can be used together with a desired number of connector assemblies. The trunk 104 is supported by a tree stand 112. A DC power plug 118 provides DC power to the trunk 104. DC power is transmitted through the trunk 104 via internal DC power lead 123, upper internal DC power lead 122, lower internal DC power lead 120 and similar power leads throughout the trunk 104. Electrical connections between the trunk sections 106, 108, 110 are made at the connector assemblies 114, 116.

Figure 2:
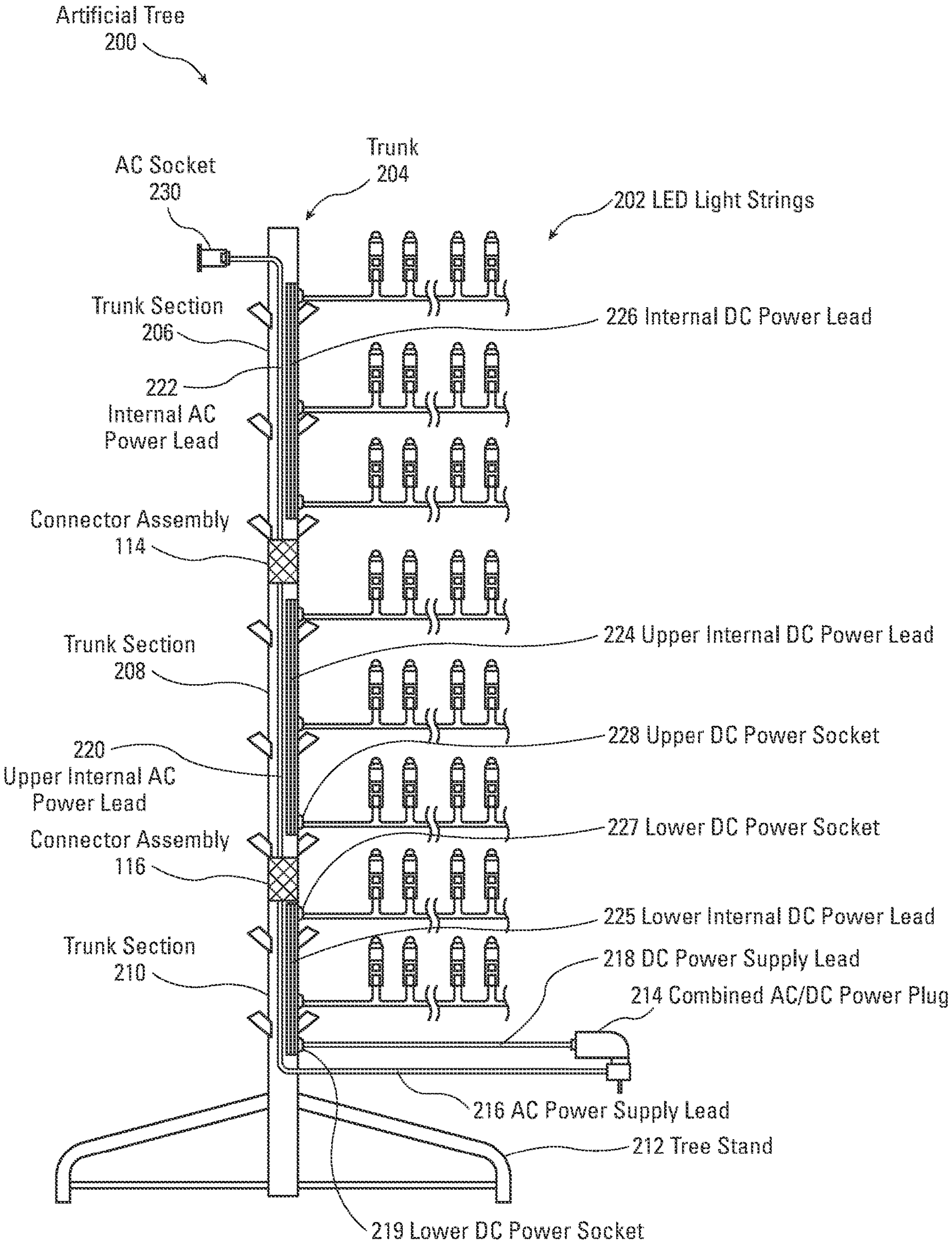
FIG. 2 is a schematic side view of another embodiment of the present invention.

FIG. 2 is a schematic side view of another embodiment of an artificial tree 200. The trunk 204 is made up of a plurality of trunk sections 206, 208, 210. A plurality of LED light strings 202 are connected to the trunk 204 and obtain DC power through DC power sockets, such as lower DC power socket 219, lower DC power socket 227 and upper DC power socket 228. Combined AC/DC power plug 214 provides DC power through DC power supply lead 218 and AC power through AC power supply lead 216. The trunk 204 is supported by a tree stand 212. Connector assemblies 114, 116 provide electrical connections between the trunk sections 206, 208, 210. AC power supply lead 216 is inserted into the interior portion of trunk section 210 and connects with the connector assembly 116. DC power supply lead 218 connects to a lower DC power socket 219. A lower internal DC power lead 225 is connected to an interior portion of lower DC power socket 219 at one end and to at least one DC power socket, such as lower DC power socket 227, at another end. Similar DC power leads, such as upper internal DC power lead 224, is disposed in trunk section 208 while internal DC power lead 226 is disposed in trunk section 206. These DC power supply leads that are internal to the trunk sections 208, 206 provide DC power from an interior portion of trunk sections 210, 208, 206 and are connected to DC power sockets that extend through the walls of the trunk sections 206, 208, 210, so that the DC receptacles are accessible on an exterior portion of the trunk sections 206, 208, 210. AC power from AC power supply lead 216 connects through a plug and socket in the connector assembly 116 and a similar plug and socket in connector assembly 114. The AC power supply lead 216, upper internal AC power lead 220 and internal AC power lead 222 are disposed on the interior portion of the trunk sections 210, 208, 206 and connect to the AC socket 230. The AC socket 230 is at the top of the trunk section 206 and provides AC power to an ornament that may be attached to the top of the trunk section 206.

Figure 3:
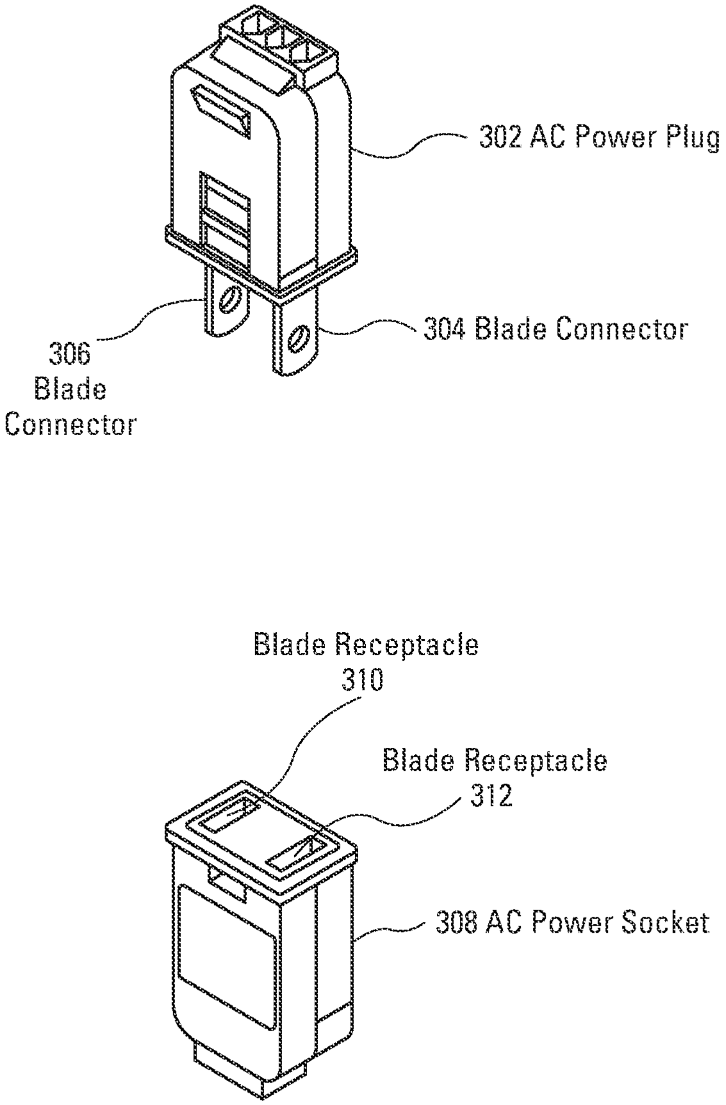
FIG. 3 is an isometric view of an AC power plug and an AC power socket that are used in the embodiment of FIG. 2.

FIG. 3 is a schematic isometric view of an AC power plug 302 and an AC power socket 308. AC power plug 302 has blade connectors 304, 306 that conduct AC power through the AC power plug 302. AC power socket 308 has blade receptacles 310, 312 that conduct power from the blade connectors 306, 304 respectively, when the AC power plug 302 is connected to the AC power socket 308.

Figure 4:
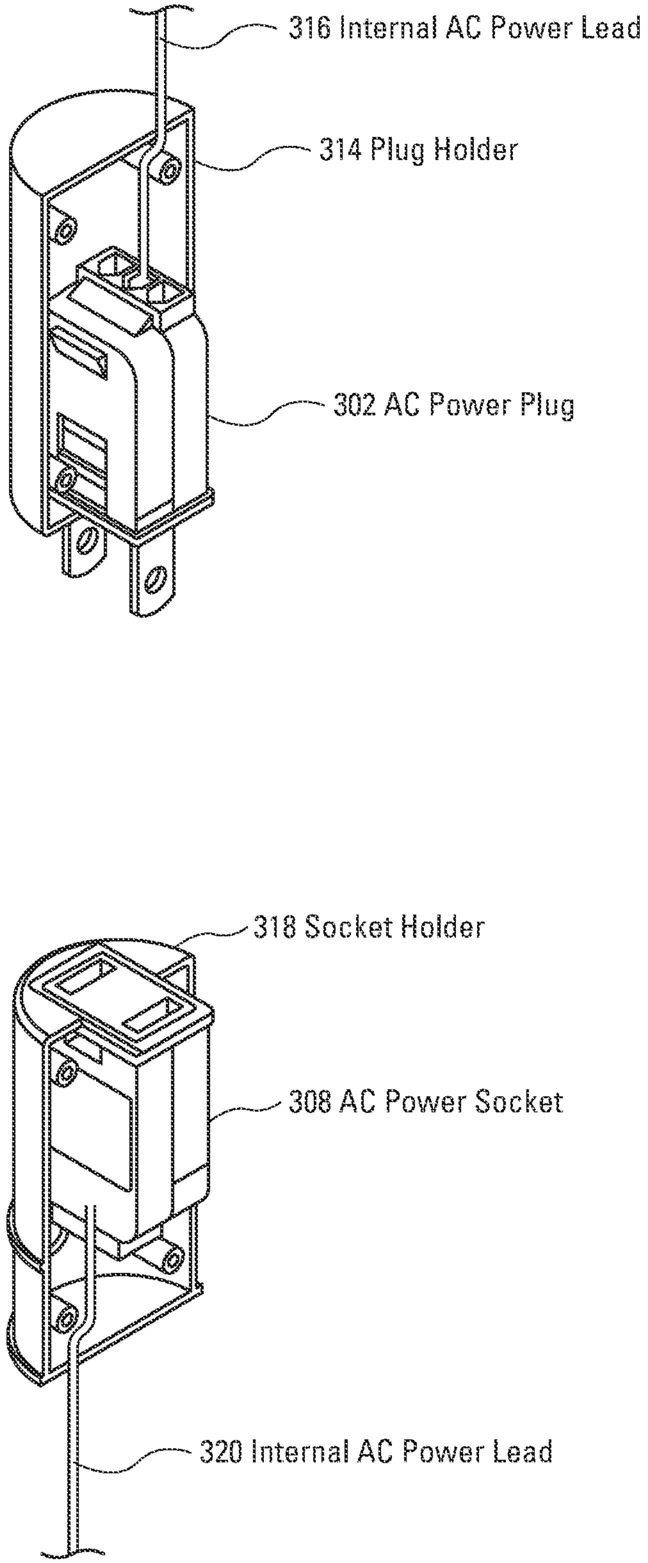
FIG. 4 is an isometric view of an AC power plug and an AC power socket that are partially mounted in a plug holder and socket holder, respectively.

FIG. 4 is an isometric view of an embodiment of the AC power plug 302 and AC power socket 308 that are mounted in portions of a plug holder 314 and socket holder 318, respectively. AC power plug 302 is connected to an internal AC power lead 316. AC power socket 308 is connected to an internal AC power lead 320.

Figure 5:
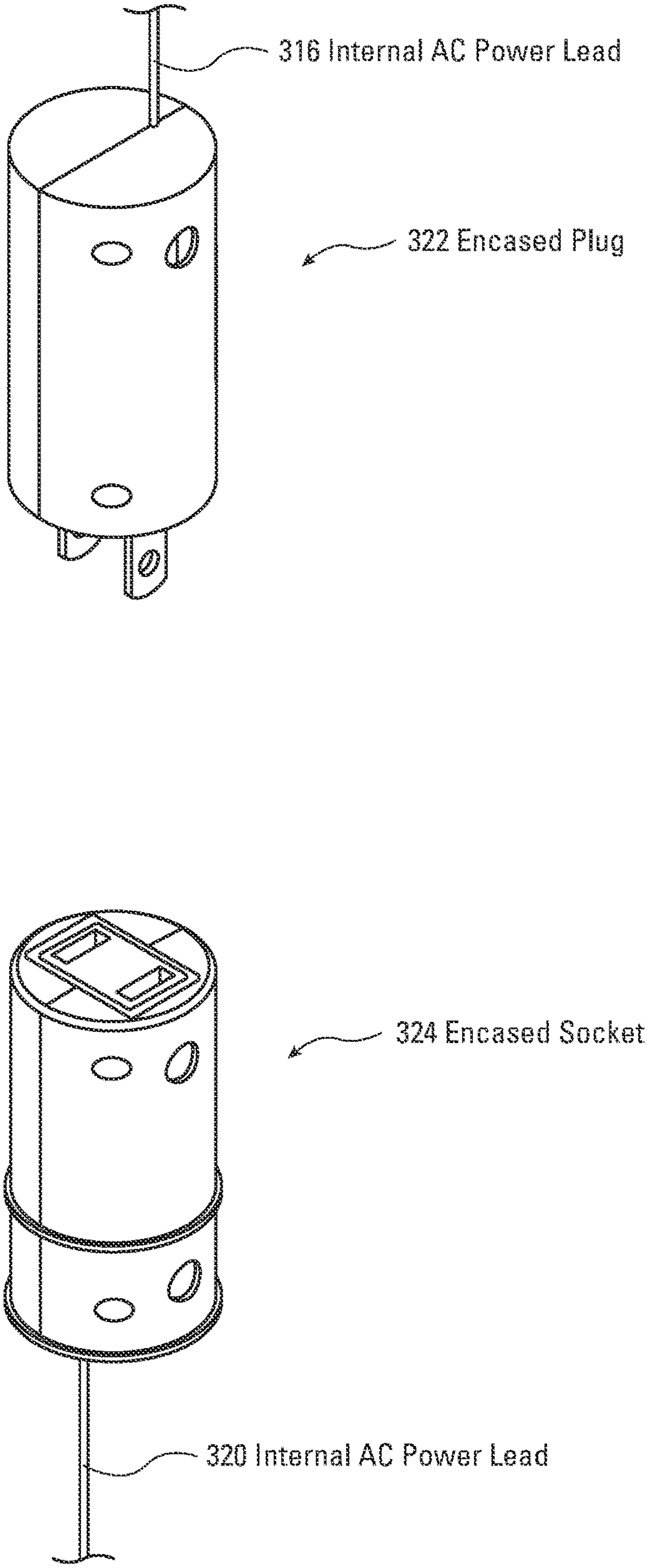
FIG. 5 is an isometric view of an embodiment of an encased plug and an encased socket.

FIG. 5 is an isometric view of an embodiment of an encased plug 322 and encased socket 324. As illustrated in FIG. 5, internal AC power lead 316 extends from the encased plug 322. The encased plug cover is cylindrical so as to mount within the cylindrical shape of the trunk section. Similarly, the encased socket 324 has a cylindrical shape for mounting in the cylindrical interior portion of the trunk section. The internal AC power lead 320 extends from the encased socket 324.

Figure 6:
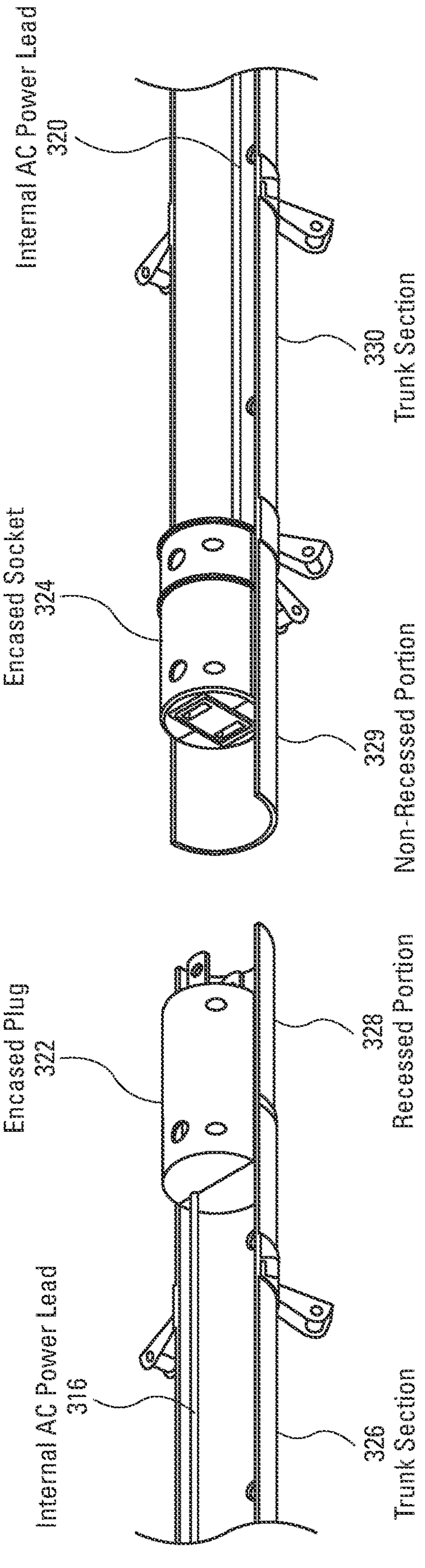
FIG. 6 is an isometric cut-away assembly view of an encased plug and an encased socket in an artificial tree trunk.

FIG. 6 is schematic cutaway assembly view illustrating the encased plug 322 and encased socket 324 mounted in trunk sections 326, 330. As illustrated in FIG. 6, the internal AC power lead 316 is disposed in the interior portion of the trunk section 326. The encased plug 322 is mounted adjacent to the end of trunk section 326 and partially within the recessed portion 328. The recessed portion 328 fits within the non-recessed portion 329 of trunk section 330 when assembled. The encased socket 324 is mounted adjacent to the end of trunk section 330. In that manner, the encased plug 322 and the encased socket 324 can engage each other when the trunk sections 326, 330 are assembled. Internal AC power lead 320 is connected to the encased socket 324.

Figure 7:
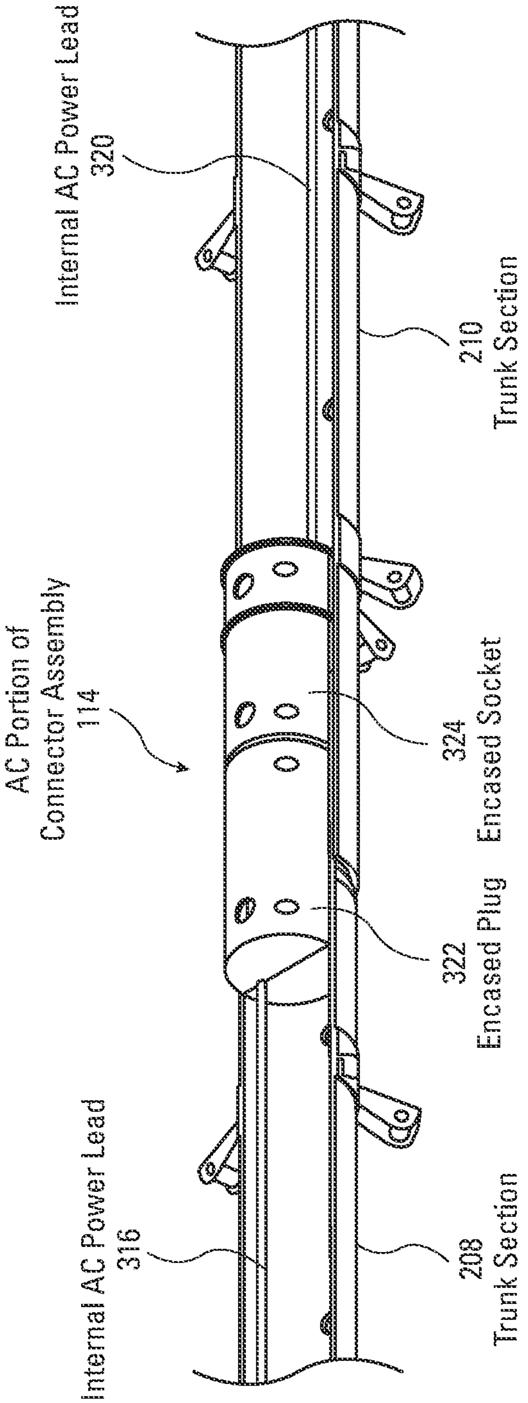
FIG. 7 a cut-away isometric view of an AC portion of a connector assembly in an artificial tree trunk.

FIG. 7 is a schematic cutaway view of the AC portion of connector assembly 114 and trunk sections 208, 210 in an assembled position. Internal AC power lead 316 is connected to the encased plug 322. Internal AC power lead 320 is connected to the encased socket 324.

Figure 8:
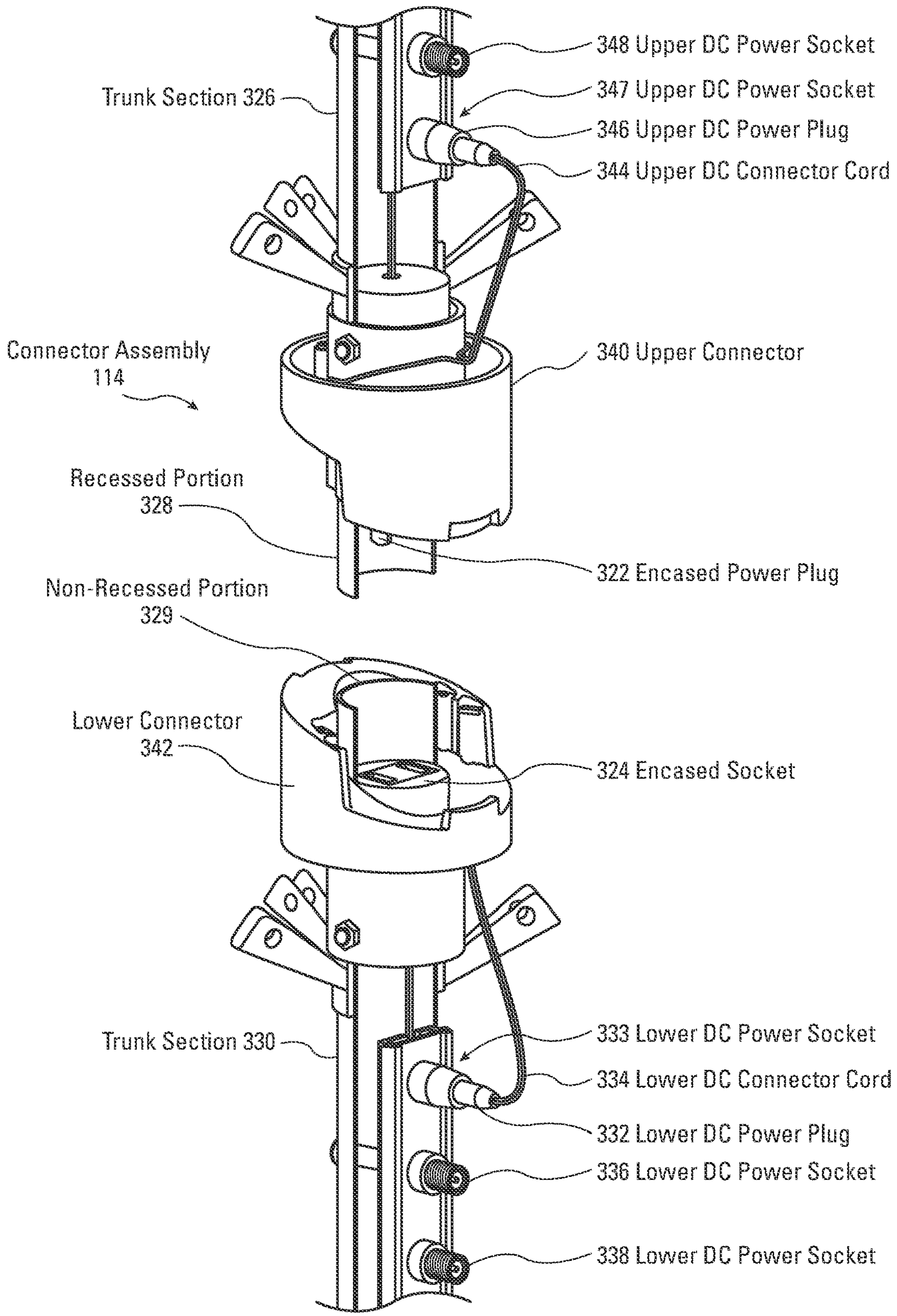
FIG. 8 is an isometric assembly view of the assembly of the trunk sections and the electrical connectors in accordance with one embodiment of the invention.

FIG. 8 is a schematic isometric view of trunk sections 326, 330 in an assembly view illustrating the connector assembly 114 that comprises the AC and DC combined electrical connectors. As illustrated in FIG. 8, trunk section 330 has a plurality of DC power sockets, such as lower DC power sockets 333, 336, 338. A lower DC connector cord 334 is plugged into lower DC power socket 333 so that the lower DC connector cord 334 can provide power to the lower connector 342. Lower connector 342 is connected to the exterior portion of the trunk section 330. Encased socket 324 is disposed at the opening of the lower connector 342. Encased socket 324 extends partially into the non-recessed portion 329. Trunk section 326 has a number of DC power sockets, including upper DC power sockets 347, 348. Upper DC power plug 346 is plugged into upper DC power socket 347. Upper DC connector cord 344 is connected to the upper connector 340 and supplies DC power to the upper connector 340. Trunk section 330 has a plurality of lower DC power sockets 333, 336, 338. Lower DC power plug 332 is plugged into lower DC power socket 333 and supplies DC power over lower DC connector cord 334 to the lower connector 342. In this manner, DC power is transferred between trunk sections 330, 326, via lower connector 342 and upper connector 340. An encased power plug 322 is disposed inside the trunk section 326 at the opening of the upper connector 340. Encased socket 324 is disposed in the trunk section 330 at the opening of lower connector 342. AC power is transferred between trunk sections 330, 326 by encased socket 324 and encased power plug 322.

Figure 9:
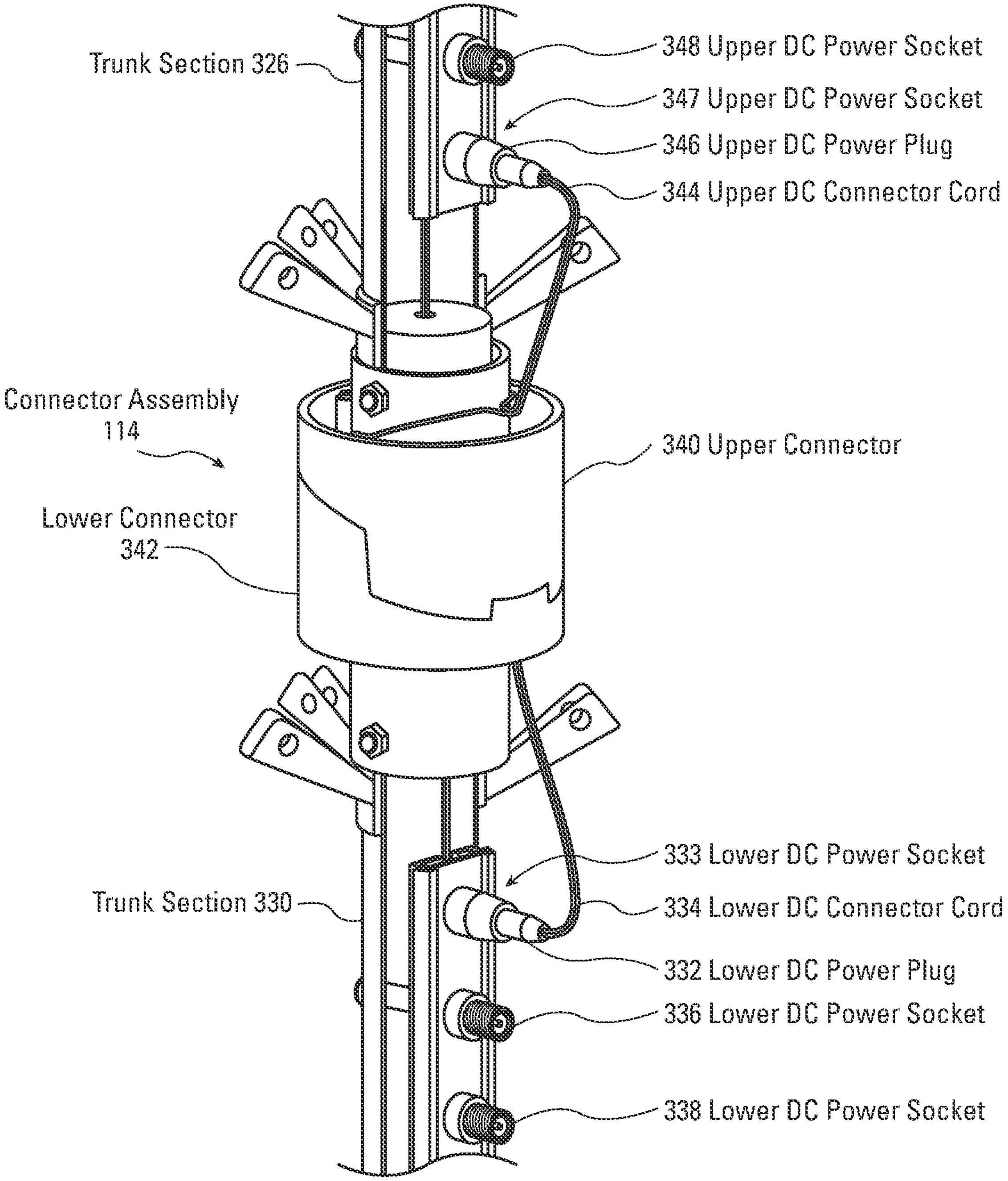
FIG. 9 is an assembled view of FIG. 8.

FIG. 9 is a schematic isometric view of the components of FIG. 8, including connector assembly 114, in an assembled condition. As illustrated in FIG. 9, trunk section 326 includes an upper DC power socket 348, which is used to supply DC power to light strings on the artificial tree. Upper DC power plug 346 is plugged into upper DC power socket 347 and is electrically connected via upper DC connector cord 344 to the upper connector 340. Lower DC power plug 332 is plugged into lower DC power socket 333, which supplies power to the lower DC connector cord 334. Lower DC connector cord 334 is connected to the lower connector 342 and supplies DC power to the lower connector 342. Internal connectors in the lower connector 342 and upper connector 340 allow DC power to be transferred from the lower connector 342 to the upper connector 340. Trunk section 330 includes lower DC power socket 336 and lower DC power socket 338, which are used to supply power to the light strings for an artificial tree.

Figure 10:
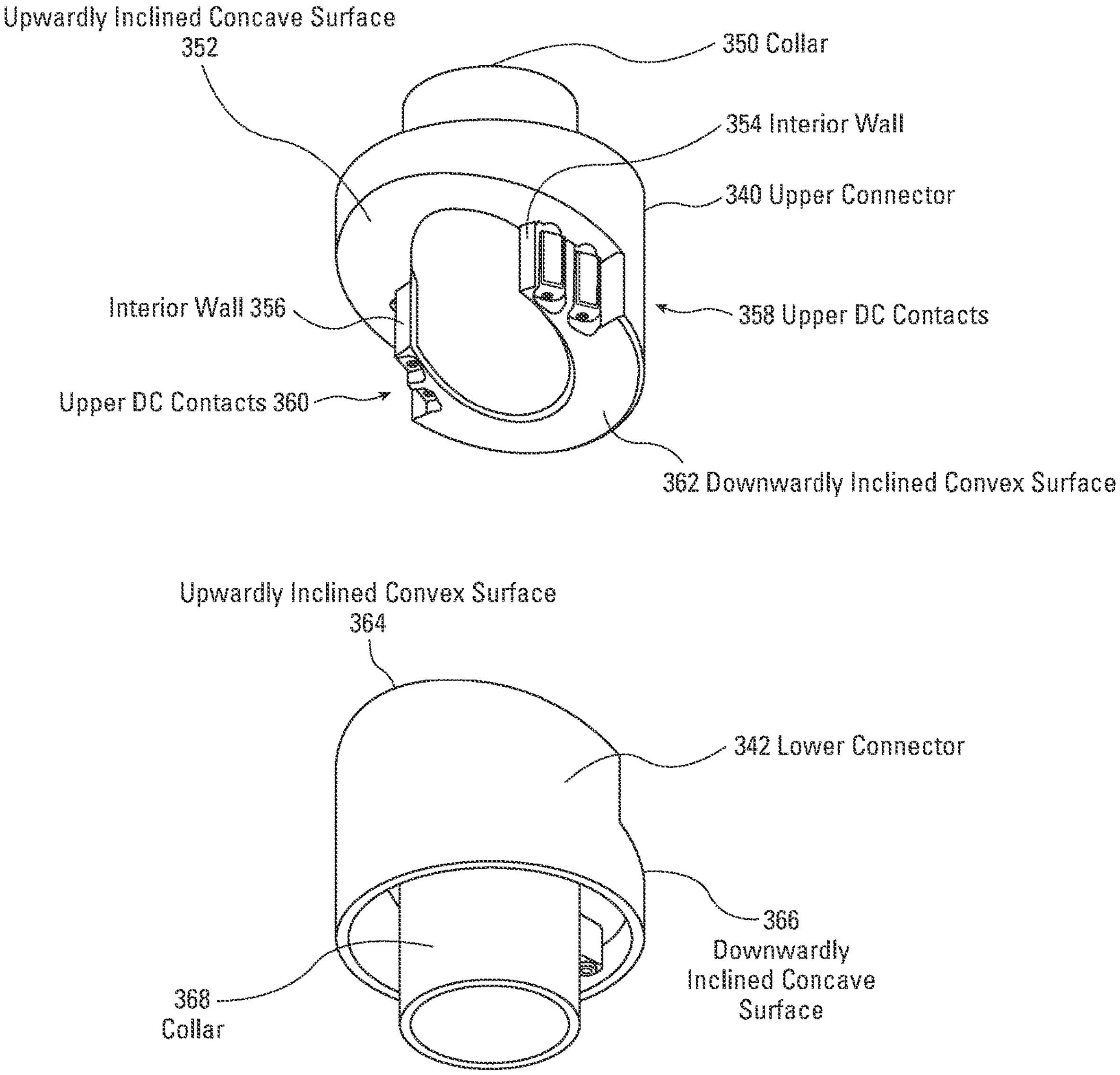
FIG. 10 is an isometric view of the upper connector and the lower connector.

FIG. 10 is a schematic isometric view of upper connector 340 and lower connector 342. Upper connector 340 has a collar 350 that fits around the trunk 204 (FIG. 2) of the artificial tree. Openings in the collar 350 may provide a manner of securing the upper connector 340 to the trunk 204 (FIG. 2) of the tree. Upper connector 340 has an upwardly inclined concave surface 352 that engages an upwardly inclined convex surface 364 of the lower connector 342, when assembled. Upper connector 340 has a downwardly inclined convex surface 362 that mates with a downwardly inclined concave surface 366 on lower connector 342. The upwardly inclined concave surface 352 and upwardly inclined convex surface 364, as well as downwardly inclined convex surface 362 and downwardly inclined concave surface 366 function to align the upper connector 340 and lower connector 342 and securely hold the upper connector 340 to the lower connector 342. Upper connector 340 has an interior wall that is backed by the trunk section that protrudes through the central opening in the upper connector 340. Upper DC contacts 360 are supported on interior wall 356. Interior wall 354 is similarly backed by the trunk section and supports upper DC contacts 358. Since the upper DC contacts 360, 358 are mounted on an interior wall, the upper DC contacts 360, 358 face in an outward direction away from the trunk section. Lower connector 342 also has a collar 368 that is connected to the trunk section and may be bolted to the trunk section. As such, radial forces are created between the contacts to ensure a solid connection.

Figure 11:
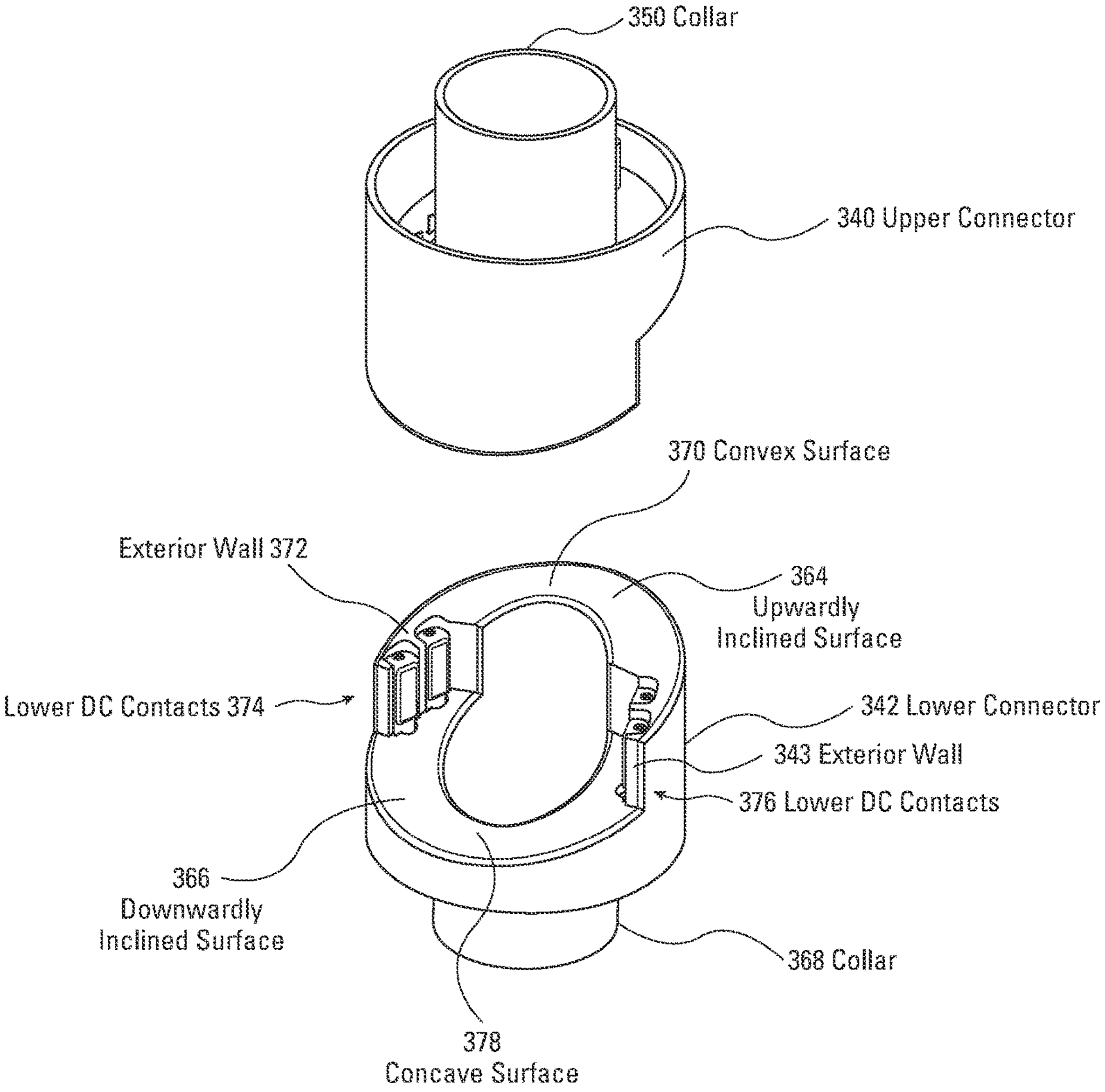
FIG. 11 is another isometric view of the upper connector and the lower connector in accordance with one embodiment of the invention.

FIG. 11 is another isometric view illustrating the upper connector 340 and lower connector 342. Again, upper connector 340 has a collar 350 that connects to the trunk section of the artificial tree. Lower connector 342 has a convex surface 370 on the upwardly inclined surface 364. Downwardly inclined surface 366 has a concave surface 378. Convex and concave surfaces can also be included on the upwardly inclined surface 352 (FIG. 10) and downwardly inclined surface 362 (FIG. 10) of upper connector 340 to ensure that the upper connector 340 and the lower connector 342 are locked in position and a radially inward force can be created between the upper connector 340 and the lower connector 342. These convex and concave surfaces on the upper connector 340 can match the convex surface 370 and concave surface 378 of lower connector 342. Lower connector 342 has an exterior wall 372 that supports the lower DC contacts 374, which are facing in a generally inward direction towards the center of the lower connector 342. Exterior wall 343 supports lower DC contacts 376 so that the lower DC contacts 376 face in a generally inward radial direction. Similar connectors are disclosed in U.S. patent application Ser. No. 17/444,885, filed Aug. 11, 2021, by Yu, which is incorporated herein, by reference for all that it discloses and teaches.

Figure 12:
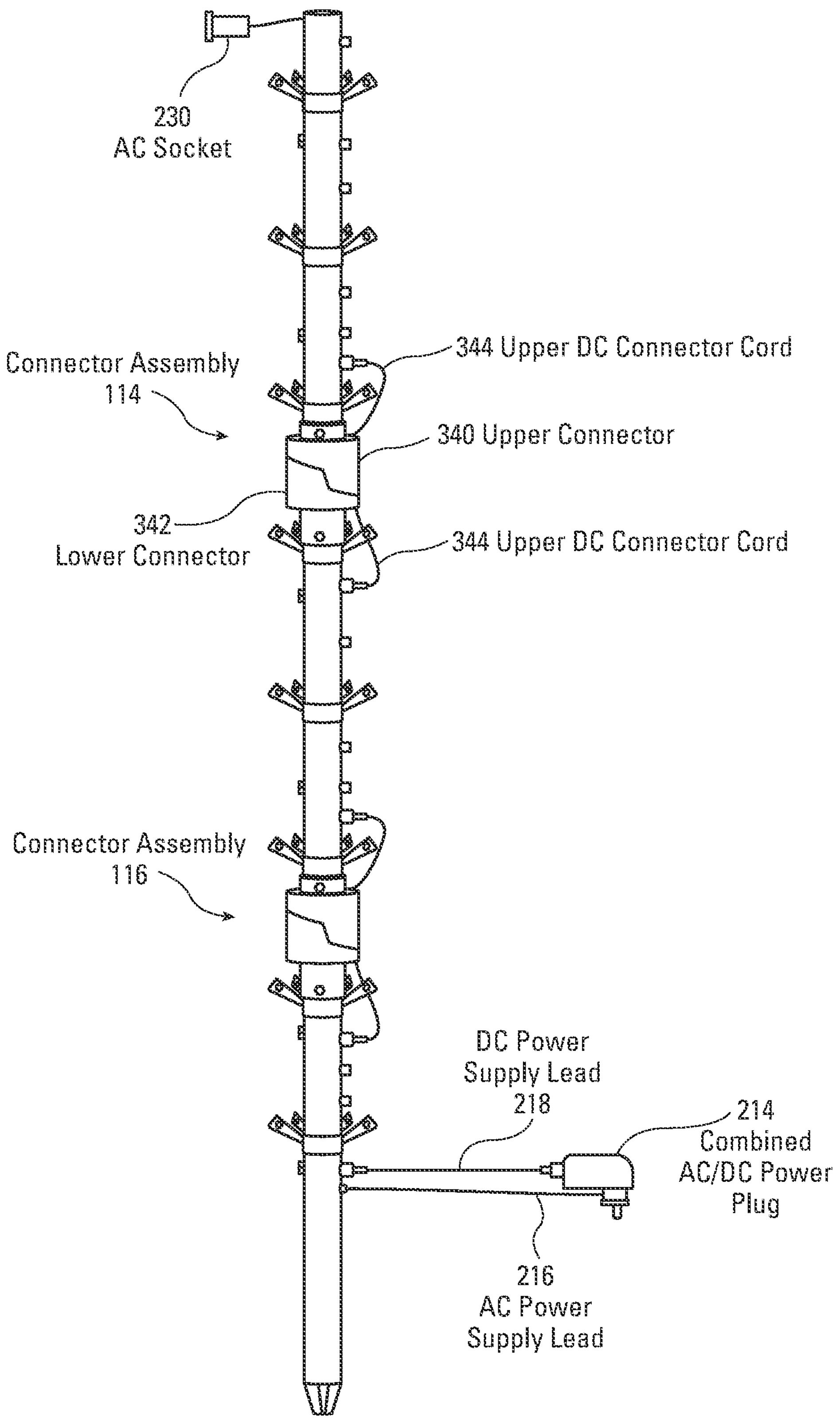
FIG. 12 is an assembled view of the trunk of the artificial tree, illustrating the connector assemblies.

FIG. 12 is a schematic isometric view of the trunk of an artificial tree of the present invention in an assembled condition. As illustrated in FIG. 12, combined AC/DC power plug 214 provides DC power on DC power supply lead 218 and AC power on AC power supply lead 216. Both the AC power and DC power are transferred through the connector assembly 116. Similarly, connector assembly 114 transfers both AC power and DC power between trunk sections. Connector assembly 114 includes lower connector 342, which receives DC power from upper DC connector cord 344 and transfers DC power to the upper connector 340. DC power from the upper connector 340 is then transferred through upper DC connector cord 344 to an upper trunk section. AC power is also transferred through the connector assembly 116 and connector assembly 114 to AC socket 230. Again, AC socket 230 supplies AC power at the top of the trunk section, which may be used to light an artificial ornament at the top of the trunk section.

Accordingly, both AC power and DC power can be transmitted through the connector assemblies that are mounted on the trunk sections through separate AC connectors and DC connectors. Both the AC connectors and the DC connectors are aligned to fit together and provide a secure and safe manner of transferring AC and DC power through the trunk sections, such as trunk sections 206, 208, 210 (FIG. 2). AC power is then available at the top portion of the top trunk section 206 (FIG. 2) so that an AC power ornament can be powered at the top of the artificial tree 200. The single combined AC/DC power plug 214 provides both AC and DC power to the artificial tree 200 in a single combined plug configuration.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of supplying both alternating current (AC) power and direct current (DC) power to an artificial tree comprising:

providing a combined AC and DC power plug that supplies AC power on an AC power supply lead and DC power on a DC power supply lead;

connecting said AC power supply lead to an AC power socket of a connector assembly, said AC power socket mounted in an interior portion of a first trunk section of said artificial tree;

mounting an AC power plug, of said connector assembly, in an interior portion of a second trunk section of said artificial tree, so that said AC power plug engages said AC power socket when said first trunk section is joined together with said second trunk section;

connecting a DC power supply lead to at least one lower DC power socket mounted on said first trunk section;

placing a lower internal DC power lead in said interior portion of said trunk of said first trunk section;

connecting a first end of said lower internal DC power lead to said at least one lower DC power socket;

connecting a second end of said lower internal DC power lead to at least one additional lower DC power socket;

connecting a lower DC connector cord to said at least one lower DC power socket on said first trunk section;

connecting an upper DC connector cord to at least one upper DC power socket on said second trunk section;

connecting said lower DC connector cord to a lower connector of a connector assembly;

connecting said upper DC connector cord to an upper connector of said connector assembly;

aligning said lower connector with said AC power socket;

aligning said upper connector with said AC power plug;

joining said lower connector and said upper connector so that upper DC contacts on said upper connector and lower DC contacts on said lower connector are engaged and said AC power plug is inserted into said AC power socket to transfer both AC power and DC power through said connector assembly.

2. The method of claim 1 wherein connecting said DC power supply lead to said first DC power socket on said first trunk section comprises:

plugging said DC power supply lead into said first DC power socket on said first trunk section, said first DC power socket mounted on an exterior portion of said first trunk section.

3. The method of claim 2 further comprising:

plugging at least one LED light string into said at least one lower DC power socket on said first trunk section.

4. The method of claim 3 further comprising:

plugging at least one LED light string into said at least one upper DC power socket on said second trunk section.

5. A system of supplying both alternating current (AC) power and direct current (DC) power to an artificial tree comprising:

a combined AC and DC power plug that supplies AC power and DC power to said artificial tree;

an AC power supply lead connected to said combined AC and DC power plug that supplies AC power to said artificial tree;

a DC power supply lead connected to a lower DC power socket that supplies DC power to said artificial tree;

a connector assembly comprising:

an AC power socket connected to said AC power supply lead, said AC power socket mounted in an interior portion of a first trunk section of said artificial tree proximate to an end portion of said first trunk section;

an AC power plug mounted in a second trunk section of said artificial tree at a location proximate to an end portion of said second trunk section so that said AC power plug engages said AC power socket to transfer AC power between said AC power socket and said AC power plug when said first trunk section is assembled with said second trunk section;

a lower connector mounted on an exterior portion of said first trunk section and aligned with said AC power socket, said lower connector connected to said DC power supply lead and having a lower connector structure and lower DC contacts;

an upper connector mounted on an exterior portion of said second trunk portion and aligned with said AC power plug, said upper connecter having a structure that matches and engages said lower connector structure, and upper DC contacts that connect with said lower DC contacts to transfer DC power between said lower connector and said upper connector when said first trunk section is assembled with said second trunk section;

a plurality of lower DC power sockets disposed on said first trunk section that are electrically connected to said DC power supply lead;

a lower internal DC power lead that connects said plurality of lower DC power sockets so that at least one light string can be connected to at least one of said plurality of lower DC power sockets;

a plurality of upper DC power sockets disposed on said second trunk section that are electrically connected to said upper connector;

an upper internal DC power lead that connects said plurality of upper DC power sockets so that said at least one light string can be connected to said plurality of upper DC power sockets.

6. The system of claim 5 further comprising:

a plug connected to said DC power supply lead that plugs into one of said plurality of lower DC power sockets.

7. The system of claim 6 further comprising:

an upper DC power plug that plugs into one of said plurality of upper DC power sockets.

8. The system of claim 7 further comprising:

a plurality of light strings plugged into said plurality of lower DC power sockets.

9. The system of claim 8 further comprising:

a plurality of light strings plugged into said plurality of upper DC power sockets.

* * * * *